United States Patent
Crews et al.

(10) Patent No.: US 7,696,134 B2
(45) Date of Patent: *Apr. 13, 2010

(54) UNSATURATED FATTY ACIDS AND MINERAL OILS AS INTERNAL BREAKERS FOR VES-GELLED FLUIDS

(75) Inventors: James B. Crews, Willis, TX (US); Tianping Huang, Spring, TX (US)

(73) Assignee: Baker Hughes Incorporated, Houston, TX (US)

(*) Notice: Subject to any disclaimer, the term of this patent is extended or adjusted under 35 U.S.C. 154(b) by 178 days.

This patent is subject to a terminal disclaimer.

(21) Appl. No.: 11/849,780

(22) Filed: Sep. 4, 2007

(65) Prior Publication Data

US 2008/0227672 A1    Sep. 18, 2008

Related U.S. Application Data

(63) Continuation-in-part of application No. 11/373,044, filed on Mar. 10, 2006, and a continuation-in-part of application No. 11/517,688, filed on Sep. 8, 2006, now Pat. No. 7,347,266.

(60) Provisional application No. 60/662,336, filed on Mar. 16, 2005, provisional application No. 60/717,307, filed on Sep. 15, 2005.

(51) Int. Cl.
*C09K 8/60* (2006.01)
*E21B 43/22* (2006.01)

(52) U.S. Cl. .................................. 507/260; 166/270.1

(58) Field of Classification Search ................ 507/260; 166/270.1
See application file for complete search history.

(56) References Cited

U.S. PATENT DOCUMENTS

| 4,735,731 A * | 4/1988 | Rose et al. ................ 507/105 |
| 6,881,709 B2 * | 4/2005 | Nelson et al. .............. 507/203 |
| 2002/0004464 A1 | 1/2002 | Nelson et al. |
| 2006/0211776 A1 | 9/2006 | Crews |
| 2007/0056737 A1 | 3/2007 | Crews et al. |

FOREIGN PATENT DOCUMENTS

| GB | 2368602 A | 5/2002 |
| WO | 01/77487 A2 | 10/2001 |
| WO | 02/064946 A1 | 8/2002 |
| WO | 2004/007904 A1 | 1/2004 |
| WO | 2004/057155 A1 | 7/2004 |

OTHER PUBLICATIONS

ESCAID 110 Fluid, Sales Specification, Revised Aug. 2000.*
B. R. Stewart, et al., "Use of a Solids-free Viscous Carrying Fluid in Fracturing Applications: An Economic and Productivity Comparison in Shallow Completions," SPE 30114, European Formation Damage Control Conference, The Hague, The Netherlands, May 15-16, 1995, pp. 379-392.
J. Ernest Brown, et al., "Use of a Viscoelastic Carrier Fluid in Frac-Pack Applications," SPE 31114, SPE Formation Damage Symposium, Lafayette, LA, Feb. 14-15, 1996, pp. 439-448.
M. Samuel, et al., "Viscoelastic Surfactant Fracturing Fluids: Applications in Low Permeability Reservoirs," SPE 60322, 2000 SPE Rocky Mountain Regional/Low Permeability Reservoirs Symposium and Exhibition, Denver, CO, Mar. 12-15, 2000, pp. 1-7.
P. M. McElfresh, et al., "A Single Additive Non-ionic System for Frac Packing Offers Operators a Small Equipment Footprint and High Compatibility with Brines and Crude Oils," SPE 82245, SPE European Formation Damage Control Conference, The Hague, The Netherlands, May 13-14, 2003, pp. 1-11.

* cited by examiner

*Primary Examiner*—Timothy J. Kugel
*Assistant Examiner*—Atnaf Admasu
(74) *Attorney, Agent, or Firm*—Mossman Kumar & Tyler PC (57) ABSTRACT

Fluids viscosified with viscoelastic surfactants (VESs) may have their viscosities reduced (gels broken) by the direct or indirect action of a synergistic internal breaker composition that contains at least one first internal breaker that may be a mineral oil and a second breaker that may be an unsaturated fatty acid. The internal breakers may initially be dispersed oil droplets in an internal, discontinuous phase of the fluid. This combination of different types of internal breakers break the VES-gelled aqueous fluid faster than if one of the breaker types is used alone in an equivalent total amount.

13 Claims, 2 Drawing Sheets

UNSATURATED FATTY ACIDS AND MINERAL OILS AS INTERNAL BREAKERS FOR VES-GELLED FLUIDS

CROSS-REFERENCE TO RELATED APPLICATION

This application is a continuation-in-part of U.S. patent application Ser. No. 11/373,044 filed Mar. 10, 2006 (published Sep. 21, 2006 as U.S. Patent Application Publication No. 2006/0211776 A1), which in turn claims the benefit of U.S. Provisional Application No. 60/662,336 filed Mar. 16, 2005, and is also a continuation-in-part of U.S. patent application Ser. No. 11/517,688 filed Sep. 8, 2006 (published Mar. 15, 2007 as U.S. Patent Application Publication No. 2007/0056737 A1), which in turn claims the benefit of U.S. Provisional Application No. 60/717,307 filed Sep. 15, 2005.

TECHNICAL FIELD

The present invention relates to gelled aqueous treatment fluids used during hydrocarbon recovery operations, and more particularly relates, in one non-limiting embodiment, to methods of "breaking" or reducing the viscosity of aqueous treatment fluids containing viscoelastic surfactant gelling agents used during hydrocarbon recovery operations through internal breakers and particularly synergistic combinations of internal breakers.

TECHNICAL BACKGROUND

One of the primary applications for viscosified fluids is hydraulic fracturing. Hydraulic fracturing is a method of using pump rate and hydraulic pressure to fracture or crack a subterranean formation. Once the crack or cracks are made, high permeability proppant, relative to the formation permeability, is pumped into the fracture to prop open the crack. When the applied pump rates and pressures are reduced or removed from the formation, the crack or fracture cannot close or heal completely because the high permeability proppant keeps the crack open. The propped crack or fracture provides a high permeability path connecting the producing wellbore to a larger formation area to enhance the production of hydrocarbons.

The development of suitable fracturing fluids is a complex art because the fluids must simultaneously meet a number of conditions. For example, they must be stable at high temperatures and/or high pump rates and shear rates that can cause the fluids to degrade and prematurely settle out the proppant before the fracturing operation is complete. Various fluids have been developed, but most commercially used fracturing fluids are aqueous-based liquids that have either been gelled or foamed. When the fluids are gelled, typically a polymeric gelling agent, such as a solvatable polysaccharide, for example guar and derivatized guar polysaccharides, is used. The thickened or gelled fluid helps keep the proppants within the fluid. Gelling can be accomplished or improved by the use of crosslinking agents or crosslinkers that promote crosslinking of the polymers together, thereby increasing the viscosity of the fluid. One of the more common crosslinked polymeric fluids is borate crosslinked guar.

The recovery of fracturing fluids may be accomplished by reducing the viscosity of the fluid to a low value so that it may flow naturally from the formation under the influence of formation fluids. Crosslinked gels generally require viscosity breakers to be injected to reduce the viscosity or "break" the gel. Enzymes, oxidizers, and acids are known polymer viscosity breakers.

While polymers have been used in the past as gelling agents in fracturing fluids to carry or suspend solid particles as noted, such polymers require separate breaker compositions to be injected to reduce the viscosity. Further, such polymers tend to leave a coating on the proppant and a filter cake of dehydrated polymer on the fracture face even after the gelled fluid is broken. The coating and/or the filter cake may interfere with the functioning of the proppant. Studies have also shown that "fish-eyes" and/or "microgels" present in some polymer gelled carrier fluids will plug pore throats, leading to impaired leakoff and causing formation damage.

Recently it has been discovered that aqueous drilling and treating fluids may be gelled or have their viscosity increased by the use of non-polymeric viscoelastic surfactants (VES). These VES materials are in many cases advantageous over the use of polymer gelling agents in that they are comprised of low molecular weight surfactants rather than high molecular polymers. The VES materials may leave less gel residue within the pores of oil producing formations, leave no filter cake (dehydrated polymer) on the formation face, leave a minimal amount of residual surfactant coating the proppant, and inherently do not create microgels or "fish-eyes"-type polymeric masses.

However, little progress has been made toward developing internal breaker systems for the non-polymeric VES-based gelled fluids. To this point, VES gelled fluids have relied only on "external" or "reservoir" conditions for viscosity reduction (breaking) and VES fluid removal (clean-up) during hydrocarbon production. Additionally, over the past decade it has been found that reservoir brine dilution has only a minor, if any, breaking effect of VES gel within the reservoir.

Instead, only one reservoir condition is primarily relied on for VES fluid viscosity reduction (gel breaking or thinning), and that has been the rear-ranging, disturbing, and/or disbanding of the VES worm-like micelle structure by contacting the hydrocarbons within the reservoir, more specifically contacting and mixing with crude oil and condensate hydrocarbons. SPE 30114 describes how reservoir hydrocarbons reduce the viscosity of VES-gelled fluids. SPE 31114 notes that when a VES-gelled fluid contacts crude or condensate reservoir hydrocarbons, the VES-gelled fluid will break, i.e. lose viscosity. SPE 60322 describes how oil or gas reservoir hydrocarbons alter the worm-like micelles of a VES-gelled fluid into spherical micelle structures which results in water-like fluid viscosity. SPE 82245 explains that contact of a VES-gelled fluid system with hydrocarbons causes the fluid to lose its viscosity.

However, in many gas wells and in cases of excessive displacement of crude oil hydrocarbons from the reservoir pores during a VES gel treatment, results have shown many instances where VES fluid in portions of the reservoir are not broken or are incompletely broken resulting in residual formation damage (hydrocarbon production impairment). In such cases post-treatment clean-up fluids composed of either aromatic hydrocarbons, alcohols, surfactants, mutual solvents, and/or other VES breaking additives have been pumped within the VES treated reservoir in order to try and break the VES fluid for removal. However, placement of clean-up fluids is problematic and normally only some sections of the reservoir interval are cleaned up, leaving the remaining sections with unbroken or poorly broken VES gelled fluid that impairs hydrocarbon production. Because of this phenomenon and other occasions where reliance on external factors or mechanisms has failed to clean up the VES fluid from the reservoir during hydrocarbon production, or in cases where the external conditions are slow acting (instances where VES breaking and clean-up takes a long time, such as several days up to possibly months) to break and then produce the VES treatment fluid from the reservoir, and where post-treatment clean-up fluids (i.e. use of external VES breaking solutions) are inadequate in removing unbroken or poorly broken VES fluid from all sections of the hydrocarbon bearing portion of the reservoir, there has been an increasing and important industry need for VES fluids to have internal breakers. Desirable internal breakers that should be developed include breaker systems that use products that are incorporated within the VES-gelled fluid that are activated by downhole temperature that will allow a controlled rate of gel viscosity reduction over a rather short period of time of 1 to 8 hours or so, similar to gel break times common for conventional crosslinked polymeric fluid systems.

A challenge has been that VES-gelled fluids are not comprised of polysaccharide polymers that are easily degraded by use of enzymes or oxidizers, but are comprised of low molecular weight surfactants that associate and form viscous rod- or worm-shaped micelle structures. Conventional enzymes and oxidizers have not been found to act and degrade the surfactant molecules or the viscous micelle structures they form. It is still desirable, however, to provide some mechanism that relies on and uses internal phase breaker products that will help assure complete viscosity break of VES-gelled fluids.

It would be desirable if a viscosity breaking system could be devised to break the viscosity of fracturing and other well completion fluids gelled with and composed of viscoelastic surfactants, particularly break the viscosity completely and relatively quickly. It would be particularly desirable if the breakers used could be used in relatively small amounts to save on material costs.

SUMMARY

There is provided, in one non-limiting form, a method for breaking the viscosity of aqueous fluids gelled with a viscoelastic surfactant (VES) that involves adding to an aqueous fluid at least one VES in an amount effective to increase the viscosity thereof. The method further includes adding to the aqueous fluid before, during or after the VES at least one first internal breaker in an amount effective to reduce the viscosity of the gelled aqueous fluid. The first internal breaker is a mineral oil. Further, the method involves adding to the aqueous fluid before, during or after the VES at least one second internal breaker in an amount effective to reduce the viscosity of the gelled aqueous fluid. The second internal breaker may be one or more unsaturated fatty acid, including a polyenoic acid and/or a monoenoic acid.

In another non-restrictive embodiment, there is provided an aqueous fluid that contains at least one viscoelastic surfactant (VES) in an amount effective to increase the viscosity of the aqueous fluid. The fluid also contains at least one first internal breaker in an amount effective to reduce the viscosity of the gelled aqueous fluid, where the first internal breaker is again a mineral oil. There is also present in the fluid at least one second internal breaker in an amount effective to reduce the viscosity of the gelled aqueous fluid, where the second internal breaker is an unsaturated fatty acid, which may be a polyenoic acid and/or a monoenoic acid.

The methods and compositions that will be described in further detail below allow the internal breakers to work in relatively moderate to high salinity brine mix waters and/or low temperatures. Moderate to high salinities in the aqueous fluids have the effect of slowing the rate and completeness of final break when internal breakers are used in aqueous fluids gelled with a VES. It has been discovered that using two different types of internal breakers overcomes the rate-slowing effect that salinity has on the internal breakers, including at lower and higher temperatures. By using both of these internal breakers VES-gelled fluids having high salinity may be easily broken. This permits the use of a lower amount of one or the other or both of the internal breaker types. This may have a number of benefits including, but not necessarily limited to, lowering the overall cost to break a VES-gelled fluid by requiring less of one or both internal breakers when the other breaker is present, requiring less of one or both internal breakers to achieve a complete viscosity break, and/or allowing complete VES-gelled fluid viscosity breaks to be achieved more quickly when using both of these internal breakers, as compared to an identical method or composition where only one of the breaker types is used.

DETAILED DESCRIPTION

Synergistic results have been surprisingly discovered when both an unsaturated fatty acid (UFA) (e.g. a polyenoic acid) and a mineral oil are used together as internal breakers to reduce the viscosity of VES-gelled aqueous fluids. Unexpectedly, the use of both types of breakers together more easily and more efficiently breaks VES-gelled aqueous fluids. As the data discussed below will show, faster VES-gel breaking may occur than would be expected by simply combining what each individual VES internal breaker contributes alone. The discovery appears to be a very localized weakening of the VES micelles, analogous to a "pinhole" effect, so that the micelles become much more susceptible to one or both of the VES breakers. This "pinhole effect" may be considered a weakening, e.g. a reduction in the thermodynamic energy that exists between the VES head groups with themselves, water and counter-ions present (such as the salts in the brine) at a few locations on the VES micelle structure, in one non-limiting explanation. This suspected weakening appears to allow one or the other or both VES internal breakers that normally are thermodynamically unable to penetrate and collapse the micelle to somehow cause weakened locations where one or both breakers may enter the micelle and the process proceeds controllably until complete or near-complete breaking of the VES-gel occurs.

The importance of this discovery will allow less amount of one or the other or both internal breakers to be required to perform a given rate of viscosity reduction or given completeness of reduction or both, or to speed up and to more completely break the VES-gelled fluid. The use of these two types of breakers will overcome the negative effects that mix water salinity normally has on internal breakers, and will allow faster and more complete breaks to occur at lower and higher temperatures than when the breakers are used individually. That is, this discovery expands and enhances these internal breaking technologies.

More specifically, the simultaneous use of both types of internal breakers may allow the internal breakers to work in a wide range of salinity brine mix waters, in non-limiting examples from about 1% to about 24% by weight (bw) KCl; about 1% to about 44% bw NaBr, about 1% to about 37% bw $CaCl_2$ brine; about 1% to about 63% bw $CaBr_2$ brine; etc. The use of both of these two internal breaker types may overcome the rate-slowing effect salinity has on internal breakers at all temperatures, including very low temperatures, and thus mineral oil-type internal breakers and unsaturated fatty acid-type breakers may now be used together at ambient temperatures, such as about 80° F. (about 27° C.), to break VES fluids that have high salinity. By using both types of internal breakers, lower amounts of the polyenoic acid and/or the mineral oil breakers may be used, as compared with an identical fluid where only one internal breaker type is used. This will give advantages that include, but are not necessarily limited to, lowering the overall cost to break a VES-gelled aqueous fluid by requiring less internal breaker when the other breaker type is present, lowering the amount of internal breaker to achieve complete VES viscosity break, allowing a complete VES fluid viscosity break to be achieved more quickly than when using polyenoic or mineral oil breakers alone and combinations of these.

The viscoelastic surfactants are believed to impart viscosity to an aqueous fluid by the molecules organizing themselves into micelles. Spherical micelles do not give increased viscosity, however, when the micelles have an elongated configuration, for instance are "rod-shaped" or "worm-shaped", they become entangled with one another thereby increasing the viscosity of the fluid.

In one non-limiting embodiment gel-breaking products, such as the internal breakers herein, work by rearrangement of the VES micelle from rod-shaped or worm-shaped elongated structures to spherical structures: that is, the collapse or rearrangement of the viscous elongated micelle structures to non-viscous, more spherical micelle structures. Disaggregating may be understood in one non-limiting embodiment when the micelles are not closely associated physically, that is are no longer aggregated or physically interacted together thereby resulting in reduced fluid viscosity, as contrasted with rearrangement which may be understood as a different physical and chemical arrangement or aggregation of the multi-surfactant micelles that has reduced viscosity. However, the inventors do not necessarily want to be limited to any particular mechanism or explanation.

Elongated VES structures may sometimes be referred to as "living" because there is a continuous exchange of VES-type surfactants leaving the VES structures to the aqueous solution and other surfactants leaving the aqueous solution and entering or re-entering the VES micelle structures. It is suspected, in one non-restrictive explanation, that the unsaturated fatty acids over time and under specific conditions become auto-oxidized and dispersed in the VES elongated micelles and thereby allow a small opening to occur in the VES micelles that permits the mineral oil internal breakers to enter and/or further destabilize the VES micellar structure, somewhat analogous to a chemical "pinhole" or localized position that opens up or facilitates disruption of the micelles by the internal breakers. However, the inventors do not wish to be limited to any particular explanation or mechanism. It appears that use of both types of internal breakers lowers the free energy required to penetrate the VES micelle head groups, and allows or permits, or appears to transport carry the mineral oil molecules into the VES micelle. Thus, the ability of the mineral oil internal breaker to break the VES structures more quickly and completely is enhanced. Again, it seems to be that the use of UFA internal breakers distributes and creates "pinholes" or localized weakened VES head group arrangements or configurations in the VES structure that allows the mineral oil internal breaking agents to associate and further weaken the "pinhole" locally. In any event, the overall result is that the mineral oil internal breaker works more quickly in degrading the VES fluid viscosity when the unsaturated fatty acid is present in the fluid. That is, the use of both types of breakers at least partially overcome the negative influences of mix water salinity, using them both together allow the internal breakers to work more effectively and/or more quickly at lower concentrations and/or higher mix water salinity. The result is that internal breakers may be used in situations or environments when they normally are less effective or are effective only at very high concentrations. This discovery expands the domain and use of internal breakers, improves their effectiveness, and reduces the cost of using them.

The internal breaker components herein may be added safely and easily to the gel after batch mixing of a VES-gel treatment, or added on-the-fly after continuous mixing of a VES-gel treatment using a liquid additive metering system in one non-limiting embodiment, or the components may be used separately, if needed, as an external breaker solution to remove VES gelled fluids already placed downhole. The mineral oils (being inherently hydrophobic) and/or the mono- and/or polyenoic acids are not solubilized in the brine, but rather interact with the VES surfactant and/or remain as oil droplets to be dispersed and form an emulsion (oil in water type emulsion) and thus there is an oil-stabilized emulsion dispersed in the "internal phase" as a "discontinuous phase" or as an "oil-soluble" internal phase of the brine medium/VES fluid which is the "outer phase" or "continuous phase". It appears in some cases that the mineral oils, e.g., or unsaturated fatty acids (UFAs) are evenly dispersed and are incorporated within the viscous rod- or worm-like shape micelles, however, in other cases, particularly for mineral oils and other saturated hydrocarbons, the oil breaker component can remain as droplets outside of the VES micelles, or as a combination of both micellular locations to various degrees. Rheometer tests have shown, that the incorporation of the UFAs into (i.e. dispersed and/or distributed throughout, within or a part of) the VES micelles does not disturb the elongated structure and viscosity yield of the VES micelles at the levels or amounts of UFAs needed to obtain a complete VES gel viscosity break. This is remarkably unique since oils are considered to readily break the viscosity of VES fluids upon contact. The UFAs in particular, have high compatibility with VES fluids until they undergo natural or induced auto-oxidation, whereby the auto-oxidation by-products have been found to readily disturb VES micelles structures and fluid viscosity.

It is surprising and unexpected that mineral oils may serve as internal breakers. This is surprising because the literature teaches that "contact" of a VES-gelled fluid with hydrocarbons, such as those of the formation in a non-limiting example, essentially instantaneously reduces the viscosity of the gel or "breaks" the fluid. By "essentially instantaneously" is meant less than one-half hour. The rate of viscosity break for a given reservoir temperature by the methods described herein is controlled by type and amount of salts within the mix water (i.e. seawater, KCl, NaBr, CaCl$_2$, CaBr$_2$, NH$_4$Cl and the like), presence of a VES gel stabilizer (i.e. MgO, ZnO and the like), presence of a co-surfactant (i.e. sodium dodecyl sulfate, sodium dodecyl benzene sulfonate, potassium laurate, potassium oleate, sodium lauryl phosphate, and the like), VES type (i.e. amine oxide, quaternary ammonium salt, and the like), VES loading, the amount of mineral oil used, the distillation range of the mineral oil, its kinematic viscosity, the presence of components such as aromatic hydrocarbons, and now, of course, the presence of a polyenoic unsaturated fatty acid internal breaker.

It is important in most non-limiting embodiments herein to add the lower molecular weight or low viscosity mineral oil products after the aqueous fluid is substantially gelled. Addition of the lower molecular weight mineral oil prior to substantial gelling tends to prevent the gelling or viscosity increase to occur. By "substantially gelled" is meant that at least 90% of the viscosity increase has been achieved before the internal breaker (e.g. mineral oil) is added. Of course, it is acceptable to add the lower molecular weight mineral oil after the gel has completely formed. However, in another non-limiting embodiment, when using the higher molecular weight or higher viscosity mineral oils the order of addition is not important, that is, these type of mineral oils may be added prior to, during, or after the VES product is added to the aqueous fluid and gelled.

Mineral oil (also known as liquid petrolatum) is a by-product in the distillation of petroleum to produce gasoline. It is a chemically inert transparent colorless oil composed mainly of linear, branched, and cyclic alkanes (paraffins) of various molecular weights, related to white petrolatum. Mineral oil is produced in very large quantities, and is thus relatively inexpensive. Mineral oil products are typically highly refined, through distillation, hydrogenation, hydrotreating, and other refining processes, to have improved properties, and the type and amount of refining varies from product to product. Highly refined mineral oil is commonly used as a lubricant and a laxative, and with added fragrance is marketed as "baby oil" in the U.S. Most mineral oil products are very inert and non-toxic, and are commonly used as baby oils and within face, body and hand lotions in the cosmetics industry.

Other names for mineral oil include, but are not necessarily limited to, paraffin oil, paraffinic oil, lubricating oil, white mineral oil, and white oil.

In one non-limiting embodiment the mineral oil may be at least 99 wt % paraffinic. Because of the relatively low content of aromatic compounds, mineral oil has a better environmental profile than other oils. In general, the more refined and less aromatic the mineral oil, the better. In another non-restrictive version, the mineral oil may have a distillation temperature range from about 160 to about 550° C., alternatively have a lower limit of about 200° C. and independently an upper limit of about 480° C.; and a kinematic viscosity at 40° C. from about 1 to about 250 cSt, alternatively a lower limit of about 1.2 independently to an upper limit of about 125 cSt. Specific examples of suitable mineral oils include, but are not necessarily limited to, BENOL®, CARNATION®, KAYDOL®, SEMTOL®, HYDROBRITE® and the like mineral oils available from Crompton Corporation, ESCAID®, EXXSOL® ISOPAR® and the like mineral oils available from ExxonMobil Chemical, and similar products from other mineral oil manufacturers. A few non-limiting examples are specified in Table I. The ESCAID 110® and CONOCO LVT-200® mineral oils have been well known components of oil-based drilling muds and the oil industry has considerable experience with these products, thus making them an attractive choice. The white mineral oils from Crompton Corporation with their high purity and high volume use within other industries are also an attractive choice.

TABLE I

PROPERTIES OF VARIOUS MINERAL OILS

| | ESCAID 110 | EXXSOL D110 | ISOPAR V | BENOL | HYDROBRITE 200 | HYDROBRITE 1000 |
|---|---|---|---|---|---|---|
| | | | Properties | | | |
| Specific Gravity | 0.790-0.810 | 0.780-0.830 | 0.810-0.830 | 0.839-0.855 | 0.845-0.885 | 0.860-0.885 |
| Viscosity @ 40° C. | 1.3-1.9 | — | — | 18.0-20.0 | 39.5-46.0 | 180.0-240.0 |
| Flash Point (° C.) | 77.0 | 105 | 118 | 186 | — | 288 |
| Pour Point (° C.) | — | — | — | −21.0 | −9.0 | −6.0 |
| | | | Distillation Range | | | |
| IBP (° C.) | 200 | 237 | 263 | — | — | — |
| Max DP (° C.) | 248 | 277 | 329 | — | — | — |
| GC Distillation 5% (° C.) | — | — | — | — | >380 | >407 |
| Molecular Wt. | — | — | — | — | — | >480 |
| Aromatic Content | <0.5% | <1.0% | <0.5% | — | — | — |

Note:
ESCAID, EXXSOL and ISOPAR are trademarks of ExxonMobil Corporation. BENOL and HYDROBRITE are trademarks of Crompton Corporation.

It has been discovered in breaking VES-gelled fluids prepared in monovalent brines (such as 3% KCl brine) that at temperatures below about 180° F. (82° C.) ESCAID® 110 mineral oil works well in breaking VES-gelled fluids, and that at or above about 140° F. (60° C.) HYDROBRITE® 200 mineral oil works well. The use of mineral oils herein is safe, simple and economical. In some cases for reservoir temperatures between about 120° to about 240° F. (about 49° to about 116° C.) a select ratio of two or more mineral oil products, such as 50 wt % ESCAID® 110 mineral oil to 50 wt % HYDROBRITE® 200 mineral oil may be used to achieve controlled, fast and complete break of a VES-gelled fluid. The use of the polyenoic acids herein expands the ranges of brine salt concentrations for which these mineral oils are useful.

It has also been discovered that the type and amount of salt within the mix water used to prepare the VES fluid (such as 3 wt % KCl, 21 wt % $CaCl_2$, use of natural seawater, and so on) and/or the presence of a VES gel stabilizer (such as VES-STA 1 gel stabilizer available from Baker Oil Tools) may affect the activity of a mineral oil in breaking a VES fluid at a given temperature. For example, ESCAID® 110 mineral oil at 5.0 gptg will readily break the 3 wt % KCL based VES fluid at 100° F. (38° C.) over a 5 hour period, and ESCAID® 110 mineral oil may still have utility as a breaker for a 10.0 ppg $CaCl_2$ (21 wt % $CaCl_2$) based VES fluid at 250° F. (121° C.).

Other refinery distillates may potentially be used in addition to or alternatively to the mineral oils described herein, as may be hydrocarbon condensation products. Additionally, synthetic mineral oils, such as hydrogenated polyalphaolefins, and other synthetically derived saturated hydrocarbons may be of utility to practice the methods herein. More information about the use of mineral oils, hydrogenated polyalphaolefin oils, and saturated fatty acids as internal breakers may be found in U.S. Patent Application Publication 2007/0056737 A1 published Mar. 15, 2007, incorporated by reference herein in its entirety. In another non-limiting embodiment, natural unsaturated hydrocarbons such as terpenes (e.g. pinene, d-limonene, etc.), saturated fatty acids (e.g. lauric acid, palmitic acid, stearic acid, etc. from plant, fish and/or animal origins) and the like may possibly be used together with or alternatively to the mineral oils herein.

With respect to the unsaturated fatty acid internal breakers such as monoenoic acids and polyenoic acids, as internal breakers, in one non-limiting embodiment these may be specific oils that contain a relatively high amount of either monoenoic or polyenoic acids or both. There are many books and other literature sources that list the multiple types and amounts of fatty acids compositions of oils and fats available from plant, fish, animal, and the like. A polyenoic acid is defined herein as any of various fatty acids having more than one double bond (allyl group) in the carbon chain, e.g. linoleic acid. Correspondingly, a monoenoic acid is a fatty acid having only one double bond (allyl group). The terms unsaturated fatty acid (UFA) or unsaturated fatty acids (UFAs) are defined herein as oils or fats containing one or the other or both monoenoic and polyenoic fatty acids. Other suitable polyenoic acids include, but are not necessarily limited to omega-3 fatty acids, and omega-6 fatty acids, stearidonic acid, eleostearic acid, eicosadienoic acid, eicosatrienoic acid, arachidonic acid or eicosatetraenoic acid (ETA), eicosapentaenoic acid (EPA), docosapentaenoic acid, docosahexaenoic acid (DHA), cis-linoleic acid, cis-linolenic acid, gamma-linolenic acid, conjugated polyenes, and mixtures thereof. Other suitable monoenoic acids include, but are not necessarily limited to obtusilic acid, caproleic acid, lauroleic acid, linderic acid, myristoleic acid, physeteric acid, tsuzuic acid, palmitoleic acid, petroselinic acid, oleic acid, vaccenic acid, gadoleic acid, gondoic acid, cetoleic acid, nervonic acid, erucic acid, elaidic acid, t-vaccenic acid, and mixtures thereof.

Oils relatively high in monoenoic and polyenoic acids include, but are not necessarily limited to, flax (linseed) oil, soybean oil, olive oil, canola (rapeseed) oil, chia seed oil, corn oil, cottonseed oil, evening primrose oil, grape seed oil, pumpkin seed oil, safflower oil, sunflower oil, walnut oil, peanut oil, various fish oils, mammal oils, and animal oils or fats and the like.

Any of these oils or fats may be partially hydrogenated, or may contain original or additional preservatives, such as tocopherols, and the like. Additionally any one or more of these oils may be "aged" before use to adjust the product's auto-oxidation activity, along with any one or more reagent or technical grade fatty acids. Allowing a specific fatty acid or UFA oil to "age" allows auto-oxidation to initiate and progress dependant on the amount of time, environmental conditions (temperature, exposure to atmosphere, etc.), presence of other compounds (tocopherols, metal ions, etc), and the like.

It appears that the more double-bonded carbons on the fatty acid carbon chain the more active that fatty acid will be in auto-oxidation, that is, these materials auto-oxidize easier and more quickly. This seems to be a general rule, although other components in the oil may alter this rule. Table II lists the relative rates of oxidation of common fatty acids, from the "Autooxidation" section within "Chemical Reactions of Oil, Fat, and Based Products", Department of Engineering, Instituto Superior T'echnico, Lisbon, Portugal, October 1997.

TABLE II

RELATIVE OXIDATION RATES OF SOME COMMON FATTY ACIDS

| Fatty acid | Total amount of carbon atoms | Number of double carbon bonds | Relative rate of oxidation |
|---|---|---|---|
| Stearic | 18 | 0 | 1 |
| Oleic | 18 | 1 | 100 |
| Linoleic | 18 | 2 | 1200 |
| Linolenic | 18 | 3 | 2500 |

Unsaturated fatty acids have been found to break down by "auto-oxidation" into a gamut of VES-breaking products or compositions. Each oil with various monoenoic and polyenoic acids uniquely shows the breakdown of the VES surfactant micelle structure by the presence of these auto-oxidation generated byproducts. Auto-oxidation is also known as autooxidation and lipid peroxidation which includes the oxidation of unsaturated fatty acids. Auto-oxidation in this context may also include a chain reaction-multiple steps and chemical species occur in the oxidative breakdown. Various hydroperoxides may be formed in these auto-oxidations, and end products typically include, but are not necessarily limited to, carbonyl compounds (various aldehydes and ketones), alcohols, acids, and "hydrocarbons" of various types, e.g. alkanes, saturated fatty acids and the like, and mixtures thereof. A variety of technical books and papers list many of the numerous products generated by auto-oxidation (autooxidation) of unsaturated fatty acids.

Fatty acids may also decompose in a water medium and alkaline condition by hydrolysis.

It may be possible that other olefins (e.g. allyl group compounds) may be investigated and employed in the same manner that unsaturated fatty acids have been found to work toward breaking VES-gelled fluids. It also may be possible that mechanisms other than oxidation or hydrolysis may be functioning in generating VES breaking compounds from olefins and olefin derivatives, although the inventors do not want the methods and compositions herein to be limited by any supposed theory. More information about the use of mono- and polyenoic acids (UFAs) as internal breakers may be found in U.S. Patent Application Publication 2006/0211776 A1 published Sep. 21, 2006, incorporated by reference herein in its entirety.

The breaking or viscosity reduction may be triggered or initiated by heat for both types of internal breakers. The mineral oils and related internal breakers will slowly, upon heating, break or reduce the viscosity of the VES gel with the addition of or in the absence of any other viscosity reducing agent. The amount of mineral oil needed to break a VES-gelled fluid appears to be somewhat temperature dependent, with less needed as the fluid temperature increases and fluid salinity decreases, unless one of the polyenoic internal breakers described herein is included. The kinematic viscosity, molecular weight distribution, and amount of impurities (such as aromatics, olefins, and the like) also appear to influence the rate in which a mineral oil will break a VES-gelled fluid at a given temperature. Once a fluid is completely broken a degree of viscosity reheal may occur but in most cases no rehealing is expected. An effective amount of mineral oil ranges from about 50 to about 25,000 ppm based on the total fluid, in another non-limiting embodiment from a lower limit of about 500. Independently the upper limit of the range may be about 10,000 ppm based on the total fluid. The necessary proportions or amounts are expected to be lower in the presence of the polyenoic acid internal breaker. (It will be appreciated that units of gallon per thousand gallons (gptg) are readily converted to Si units of the same value as, e.g. liters per thousand liters.)

The mono- and polyenoic acids will slowly to fairly rapidly, upon heating or subjecting the acids to a temperature, auto-oxidize into the VES gel breaking compounds with the addition of or in the absence of any other agent. The amount of altered or oxidized unsaturated fatty acid needed to break a VES-gelled fluid appears to be salinity-, VES concentration- and temperature-dependent, with typically more needed as salinity increases, as the VES concentration increases, and less needed as fluid temperature increases. Of course, as previously discussed, the presence of a mineral oil internal breaker will facilitate the reduction of the VES-caused viscosity and lower the temperatures necessary for breaking to occur. Once a fluid is completely broken a degree of viscosity reheal may occur but in most cases no reheal in viscosity will occur and no phase separation of the VES occurs upon fluid cool down, that is when the test fluid is left at test temperature for a sufficient amount of time for complete to near-complete auto-oxidation of the monoenoic and/or polyenoic acids to occur. In one non-limiting embodiment, at least one second internal breaker, e.g. polyenoic acid, is present an amount from about 100 to about 20,000 ppm based on the total fluid; alternatively in an amount from about 600 ppm, independently up to about 12,000 ppm.

Controlled viscosity reduction rates using the internal breakers may be achieved at a temperature of from about 70° F. to about 300° F. (about 21 to about 149° C.), and alternatively at a temperature of from about 100° F. independently to an upper end of the range of about 280° F. (about 38 to about 138° C.). The temperature range may be shifted lower with the use of the both internal breaker types used herein. It has also been discovered that VES-gelled aqueous fluids containing the small amounts of mineral oils described herein are relatively shear stable and can tolerate some shear before viscosity reduction occurs. In one non-limiting embodiment, the fluid designer would craft the fluid system in such a way that the VES gel would break at or near the expected formation temperature after fracturing was accomplished.

Fluid design may be based primarily on formation temperature, i.e. the temperature the fluid will be heated to naturally in the formation once the treatment is over. Further, fluid design may be based on the expected cool down of the fluid during a treatment. In many cases the fracturing fluid may only experience actual reservoir temperature for 5% to 25% of the job time, and close to 50% of the fluid is never exposed to the original reservoir temperature because of the cool down of the reservoir by the initial fracturing fluid placed into the reservoir. It is because a portion of the fracturing fluid (or other fluid) will not see or be exposed to the original reservoir temperature that a cooler temperature is selected that will represent what the fluid will probably see or contact, and thus laboratory break tests are sometimes run at a cooler temperature. There would generally be no additional temperature the VES fluid would see other than original reservoir temperature. The fluid design may also be influenced by the salinity of the mix water, particularly the presence of divalent ion type mix waters, with the higher the salinity the greater the amount of combined internal breakers required.

The use of the disclosed dual internal breaker system is ideal for controlling viscosity reduction of VES-based fracturing fluids. The breaking system may also be used for breaking gravel pack fluids, acidizing or near-wellbore clean-up diverter fluids, and loss circulation pill fluids composed of VES. The breaker system may additionally work for foamed fluid applications (hydraulic fracturing, acidizing, and the like), where $N_2$ or $CO_2$ gas is used for the gas phase. The VES breaking methods and compositions herein are a significant improvement in that they give breaking rates for VES-based fluids that the industry is accustomed to with conventional polymer based fracturing fluids, such as borate crosslinked guar. Potentially more importantly, in another non-limiting example, the use of the dual internal breaker systems should help assure and improve hydrocarbon production compared to prior art that uses only external mechanisms to break the VES fluid for effective and complete VES fluid clean-up after a treatment.

In one non-limiting embodiment, the compositions herein will directly degrade the gel created by a VES in an aqueous fluid, and alternatively will reduce the viscosity of the gelled aqueous fluid either directly, or by disaggregation or rearrangement of the VES micellar structure (e.g. collapsing or disturbing the structure). However, the inventors do necessarily not want to be limited to any particular mechanism.

In another non-limiting embodiment, the composition may be modified to slow down or to increase the auto-oxidation of the unsaturated fatty acids. Addition of compounds that influence the rate of auto-oxidation is an important option for the methods and fluids herein, in particular for the lower temperatures to increase the auto-oxidation rate and at higher temperatures to slow down the auto-oxidation rate. Rate control compounds that may be used for slowing down rate of monoenoic and polyenoic acids may be antioxidants such as, but not limited to tocopherol (vitamin E), ascorbic acid (vitamin C), butylated hydroxytoluene (BHT) and other like preservatives, chelants (such as citric acid, phosphates, and EDTA), amino acids, proteins, sugar alcohols (e.g. mannitol, xylitol, lactitol, and sorbitol), salts (such as NaCl, $MgCl_2$, $CaCl_2$, NaBr and $CaBr_2$), and the like. Rate control compounds that may increase the rate of auto-oxidation may be oxidants or pro-oxidants such as, but not limited to persulfate, percarbonate, perbromate, iron, copper, manganese and other transition metals, and the like. It should be noted that there are numerous compounds that may be of utility for regulating the rate of auto-oxidation. The proportion of rate control compounds that may be advantageously used may range from a lower limit of about 0.00001% by weight to an upper limit of about 62% by weight, based on the total weight of fluid, and alternatively from a lower limit of 0.0001% by weight and/or to an upper limit of about 45% by weight. It may be noted that rate controllers used toward the lower limit may be items such as metal ions and rate controllers employed toward the upper limit may be items such as monovalent and/or divalent salts. Chelation of the metal ions tends to slow the rate of auto-oxidation as compared with non-chelated forms of the same metal ions. In one non-limiting understanding, the use of metal ions (whether or not chelated) may be understood as "catalyzing" the auto-oxidation of the UFA.

It is sometimes difficult to specify with accuracy in advance the amount of the various internal breaking components that should be added to a particular aqueous fluid gelled with viscoelastic surfactants to sufficiently or fully break the gel, in general. For instance, a number of factors affect this proportion, including but not necessarily limited to, the particular VES used to gel the fluid; the particular internal breaker used; the particular oil used as a carrier in the case of the unsaturated fatty acids; whether or not a rate-controlling agent is used and what kind; the temperature of the fluid; the downhole pressure of the fluid, the starting pH of the fluid; and the complex interaction of these various factors.

Nevertheless, in order to give an approximate feel for the proportions of the various breaking components to be used in the methods herein, approximate ranges will be provided. Effective amounts of mineral oils were given previously. In an alternative, non-limiting embodiment the amount of hydrogenated polyalphaolefin oil and saturated fatty acid that may be effective in the methods and compositions herein may range from about 25 to about 25,000 ppm, based on the total amount of the fluid. In another non-restrictive version herein, the amount of hydrogenated polyalphaolefin oil and saturated fatty acid may range from a lower end of about 400 independently to an upper end of about 16,000 ppm. The amount of unsaturated fatty acid that may be effective in the methods and compositions may range from about 100 to about 20,000 ppm, based on the total amount of the fluid. In another non-restrictive version, the amount of unsaturated fatty acid may range from a lower limit of about 500 and/or to an upper limit of about 8,000 ppm.

Any suitable mixing apparatus may be used for the methods and fluids herein. In the case of batch mixing, the VES and the aqueous fluid are blended for a period of time sufficient to form a gelled or viscosified solution. The internal breaker, particularly the mineral oil, may advantageously be added after the fluid is formulated or at least after the fluid is substantially gelled. The VES that is useful herein may be any of the VES systems that are familiar to those in the well service industry, and may include, but are not limited to, amines, amine salts, quaternary ammonium salts, amidoamine oxides, amine oxides, mixtures thereof and the like. Suitable amines, amine salts, quaternary ammonium salts, amidoamine oxides, and other surfactants are described in U.S. Pat. Nos. 5,964,295; 5,979,555; and 6,239,183, incorporated herein by reference in their entirety.

Viscoelastic surfactants improve the fracturing (frac) fluid performance through the use of a polymer-free system. These systems, compared to polymeric based fluids, can offer improved viscosity breaking, higher sand transport capability, are in many cases more easily recovered after treatment than polymers, and are relatively non-damaging to the reservoir with appropriate contact with sufficient quantity of reservoir hydrocarbons, such as crude oil and condensate. The systems are also more easily mixed "on the fly" in field operations and do not require numerous co-additives in the fluid system, as do some prior systems.

The viscoelastic surfactants suitable for use herein include, but are not necessarily limited to, non-ionic, cationic, ampho-teric, and zwitterionic surfactants. Specific examples of zwitterionic/amphoteric surfactants include, but are not necessarily limited to, dihydroxyl alkyl glycinate, alkyl ampho acetate or propionate, alkyl betaine, alkyl amidopropyl betaine and alkylimino mono- or dipropionates derived from certain waxes, fats and oils. Quaternary amine surfactants are typically cationic, and the betaines are typically zwitterionic. The thickening agent may be used in conjunction with an inorganic water-soluble salt or organic additive such as phthalic acid, salicylic acid or their salts.

Some non-ionic fluids are inherently less damaging to the producing formations than cationic fluid types, and are more efficacious per pound than anionic gelling agents. Amine oxide viscoelastic surfactants have the potential to offer more gelling power per pound, making it less expensive than other fluids of this type.

The amine oxide gelling agents $RN^+(R')_2 O^-$ may have the following structure (I):

where R is an alkyl or alkylamido group averaging from about 8 to 24 carbon atoms and R' are independently alkyl groups averaging from about 1 to 6 carbon atoms. In one non-limiting embodiment, R is an alkyl or alkylamido group averaging from about 8 to 16 carbon atoms and R' are independently alkyl groups averaging from about 2 to 3 carbon atoms. In an alternate, non-restrictive embodiment, the amidoamine oxide gelling agent is Akzo Nobel's Aromox® APA-T formulation, which should be understood as a dipropylamine oxide since both R' groups are propyl.

Materials sold under U.S. Pat. No. 5,964,295 include CLEAR-FRAC™, which may also comprise greater than 10% of a glycol. One preferred VES is an amine oxide. As noted, a particularly preferred amine oxide is APA-T, sold by Baker Oil Tools as SURFRAQ™ VES. SURFRAQ is a VES liquid product that is 50% APA-T and greater than 40% propylene glycol. These viscoelastic surfactants are capable of gelling aqueous solutions to form a gelled base fluid. The internal breaker additives herein may be used to prepare a VES system sold by Baker Oil Tools as DIAMOND FRAQ™ fracturing fluid system. DIAMOND FRAQ™ with its assured breaking technology overcomes reliance on external reservoir conditions in order to break, as compared with products such as CLEARFRAC™ fracturing fluid system.

The methods and compositions herein also cover commonly known materials as AROMOX® APA-T manufactured by Akzo Nobel and other known viscoelastic surfactant gelling agents common to stimulation treatment of subterranean formations.

The amount of VES included in the fracturing fluid depends on at least two factors. One involves generating enough viscosity to control the rate of fluid leak off into the pores of the fracture, and the second involves creating a viscosity high enough to keep the proppant particles suspended therein during the fluid injecting step, in the non-limiting case of a fracturing fluid. Thus, depending on the application, the VES is added to the aqueous fluid in concentrations ranging from about 0.5 to 25% by volume, alternatively up to about 12 vol % of the total aqueous fluid (from about 5 to 120 gptg). In another non-limiting embodiment, the range for the present formulations is from about 1.0 to about 6.0% by volume VES product. In an alternate, non-restrictive form, the amount of VES ranges from a lower limit of about 2 independently to an upper limit of about 10 volume %.

It is expected that the breaking compositions herein be used to reduce the viscosity of a VES-gelled aqueous fluid regardless of how the VES-gelled fluid is ultimately utilized. For instance, the viscosity breaking compositions could be used in all VES applications including, but not limited to, VES-gelled friction reducers, VES viscosifiers for loss circulation pills, fracturing fluids (including foamed fracturing fluids), gravel pack fluids, viscosifiers used as diverters in acidizing (including foam diverters), VES viscosifiers used to clean up drilling mud filter cake, remedial clean-up of fluids after a VES treatment (post-VES treatment) in regular or foamed fluid forms (i.e. the fluids may be "energized") with or the gas phase of foam being $N_2$ or $CO_2$, and the like.

A value of the methods and compositions herein is that a fracturing or other fluid can be designed to have enhanced breaking characteristics. That is, fluid breaking is no longer dependant on external reservoir conditions for viscosity break and is more controllable: the rate of viscosity reduction, if complete break is achieved/occurs throughout the reservoir interval. Importantly, better clean-up of the VES fluid from the fracture and wellbore may be achieved thereby. Better clean-up of the VES directly influences the success of the fracture treatment, which is an enhancement of the well's hydrocarbon productivity. VES fluid clean-up limitations and limitations of the past may be overcome or improved by the use of DIAMOND FRAQ™ improved VES gel clean-up technology and may now be improved by the use of both types of internal breakers simultaneously.

In order to practice the methods and compositions herein, an aqueous fracturing fluid, as a non-limiting example, is first prepared by blending a VES into an aqueous fluid. The aqueous fluid could be, for example, water, brine, aqueous-based foams or water-alcohol mixtures. Any suitable mixing apparatus may be used for this procedure. In the case of batch mixing, the VES and the aqueous fluid are blended for a period of time sufficient to form a gelled or viscosified solution. As noted, the internal breakers herein may be added separately or together after the fluid is substantially gelled, in one non-limiting embodiment. In another non-restricted version, a portion or all of the breaking composition may be added prior to or simultaneously with the VES gelling agent, in one non-restrictive embodiment, particularly if the breaking agent is in encapsulation form.

Propping agents are typically added to the base fluid after the addition of the VES if a fracturing fluid is being created. Propping agents may include, but are not limited to, for instance, quartz sand grains, glass and ceramic beads, bauxite grains, walnut shell fragments, aluminum pellets, nylon pellets, and the like. The propping agents may be normally used in concentrations between about 1 to 14 pounds per gallon (120-1700 $kg/m^3$) of fracturing fluid composition, but higher or lower concentrations may be used as the fracture design required. The base fluid may also contain other conventional additives common to the well service industry such as water wetting surfactants, non-emulsifiers and the like. As noted herein, the base fluid can also contain other non-conventional additives which can contribute to the breaking action of the VES fluid, and which are added for that purpose in one non-restrictive embodiment.

Any or all of the above mineral oils, hydrogenated polyalphaolefin oils, saturated fatty acids and/or unsaturated fatty acids may be provided in an extended release form such as encapsulation by polymer or otherwise, pelletization with binder compounds, absorbed or some other method of layering on a microscopic particle or porous substrate, and/or a combination thereof. Specifically, the internal breakers may be micro- and/or macro-encapsulated to permit slow or timed release thereof. In non-limiting examples, the coating material may slowly dissolve or be removed by any conventional mechanism, or the coating could have very small holes or perforations therein for the internal breakers within to diffuse through slowly. For instance, a mixture of fish gelatin and gum acacia encapsulation coating available from ISP Hallcrest, specifically CAPTIVATES® liquid encapsulation technology, may be used to encapsulate the internal breakers herein. Also, polymer encapsulation coatings such as used in fertilizer technology available from Scotts Company, specifically POLY-S® product coating technology, or polymer encapsulation coating technology from Fritz Industries could possibly be adapted to the methods herein. The internal breakers may also be absorbed onto zeolites, such as Zeolite A, Zeolite 13X, Zeolite DB-2 (available from PQ Corporation, Valley Forge, Pa.) or Zeolites Na-SKS5, Na-SKS6, Na-SKS7, Na-SKS9, Na-SKS10, and Na-SKS13, (available from Hoechst Aktiengesellschaft, now an affiliate of Aventis S.A.), and other porous solid substrates such as MICROSPONGE™ substrates (available from Advanced Polymer Systems, Redwood, Calif.) and cationic exchange materials such as bentonite clay or placed within microscopic particles such as carbon nanotubes or buckminster fullerenes. Further, the internal breakers may be both absorbed into and onto porous or other substrates and then encapsulated or coated, as described above.

In a typical fracturing operation, the fracturing fluid is pumped at a rate sufficient to initiate and propagate a fracture in the formation and to place propping agents into the fracture. A typical fracturing treatment would be conducted by mixing a 20.0 to 60.0 gallon/1000 gal water (volume/volume-the same values may be used with any Si volume unit, e.g. 60.0 liters/1000 liters) amine oxide VES, such as SUR-FRAQ™, in a 2 to 7% (w/v) (166 lb to 581 lb/1000 gal, 19.9 kg to 70.0 $kg/m^3$) KCl solution at a pH ranging from about 6.0 to about 9.0. The breaking components are typically added before or during the VES addition using appropriate mixing and metering equipment, or if needed in a separate step after the fracturing operation is complete or on the fly when going downhole. One unique aspect of the UFA breaking chemistry is how the plant, fish and like type oils may be added and dispersed within the brine mix water prior to the addition of VES, such as the suction side of common hydration units or blender tubs pumps. These oils, used at the typical concentrations needed to achieve quick and complete break, do not initially act as detrimental oils and degrade VES yield and the like. However, most other oils have a detrimental effect to VES yield if already present or when added afterwards. One novelty of the enoic-type oils described herein is they are VES-friendly initially but over time and a given temperature, or in the presence of the mineral oil internal breakers become aggressive VES gel breakers. By "VES-friendly" is meant they are compatible therewith and do not immediate decrease viscosity of aqueous fluids gelled with VES as is seen with many other oils.

In one non-limiting embodiment, the methods and compositions herein are practiced in the absence of gel-forming polymers and/or gels or aqueous fluids having their viscosities enhanced by polymers. However, combination use with polymers and polymer breakers may also be of utility. For instance, polymers may also be added to the VES fluids herein for fluid loss control purposes. Types of polymers that may serve as fluid loss control agents are various starches, polyvinyl acetates, polylactic acid, guar and other polysaccharides, gelatins, and the like.

The present invention will be explained in further detail in the following non-limiting Examples that are only designed to additionally illustrate the invention but not narrow the scope thereof.

General Procedure for Examples

To a blender were added tap water, the indicated proportion of salt, followed by the indicated proportion of viscoelastic surfactant (WG-3L VES-AROMOX® APA-T available from Akzo Nobel). The blender was used to mix the components on a very slow speed, to prevent foaming, for about 30 minutes to viscosity the VES fluid. Mixed samples were then placed into plastic bottles. Various components singly or together, in various concentrations, were then added to each sample, and the sample was shaken vigorously for 60 seconds. The samples were placed in a water bath at the indicated temperature and visually observed every 30 minutes for viscosity reduction difference between the samples. Since a goal of the research was to find a relatively rapid gel breaking composition, samples were only observed for 24 hours or less.

Viscosity reduction may be visually detected. Shaking the samples and comparing the elasticity of gel and rate of air bubbles rising out of the fluid may be used to estimate the amount of viscosity reduction observed. Measurements using a Brookfield PVS rheometer at the indicated temperatures and pressures at 100 sec$^{-1}$ were used to acquire quantitative viscosity reduction of each sample.

Figure 1:
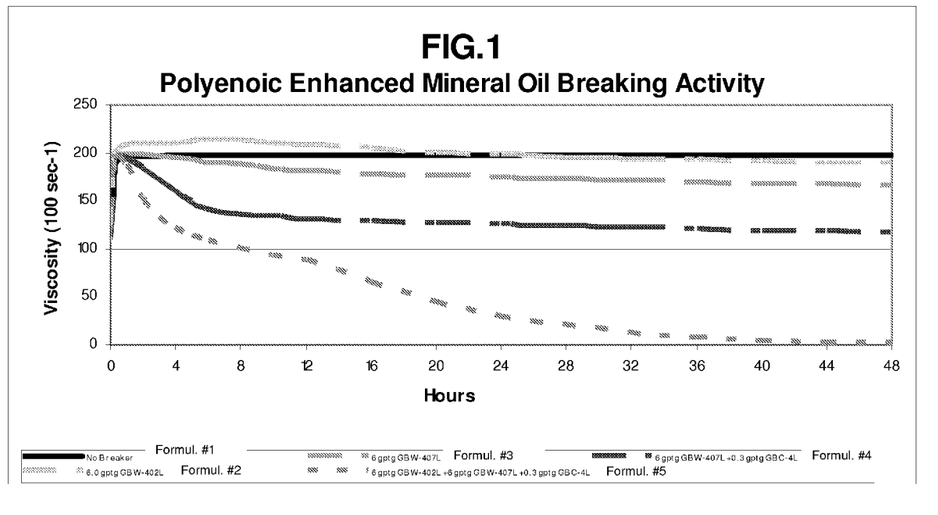
FIG. 1 is a graph showing the viscosity breaking results as a function of time using five different formulations of a brine that contained 9% KCl, 6% WG-3L VES, with 20.0 pptg (2.4 kg/m$^3$) FLC-40 fluid loss control agent, with and without a polyenoic acid internal breaker, without and with varying amounts of a transition metal ion source rate controller and with and without a mineral oil internal breaker, demonstrating a synergistic result using both the polyenoic acid internal breaker and the mineral oil internal breaker, as compared when each is used separately.

Formulations 1-5 of FIG. 1

The four formulations which gave the results shown in FIG. 1 had the following compositions:

Formulation #1: This is simply the base fluid with no internal breakers. All of the formulations, including the base fluid, contained these components: 9% KCl+6% WG-3L VES+ 20.0 pptg (2.4 kg/m$^3$) FLC-40 fluid loss control agent (slurried MgO powder mixed in monopropylene glycol, available from Baker Oil Tools).

Formulation #2: This formulation was the base fluid of Formulation #1 also including 6.0 gptg GBW-402L internal breaker (ConocoPhillips Pure Performance Base Oil 225N type mineral oil—a fairly high molecular weight mineral oil).

Formulation #3: This formulation was the base fluid of Formulation #1 also including 6 gptg GBW-407L internal breaker (Fish Oil 18:12TG high EPA and DHA unsaturated fatty acid oil product from Bioriginal Food & Science Corporation).

Formulation #4: This formulation was the same as Formulation #3 except that it also contained 0.3 gptg GBC-4L transition metal ion rate controller (15% bw CuCl$_2$.2H$_2$O solution).

Formulation #5: This formulation was the base fluid of Formulation #2 also including 6 gptg GBW-407L internal breaker and 0.3 gptg GBC-4L transition metal ion rate controller.

FIG. 1 presents curves for each Formulation showing the viscosity breaking results as a function of time. The fluid heat-up for each fluid to 134° F. (57° C.) was approximately 20 minutes. Formulation 1, which was simply the base fluid with no internal breaker, predictably had the most stable viscosity. The addition of the mineral oil internal breaker only (Formulation #2) was also very stable at these conditions. The use of the polyenoic acid breaker in Formulation #3 did reduce the viscosity more than the mineral oil of Formulation #2, but it was still relatively stable after leveling off. The addition of a rate controller to Formulation #3 gave Formulation #4; the inclusion of the rate controller together with the polyenoic acid internal breaker gave a noticeable drop in viscosity which leveled off and dropped slowly after about three hours. The addition of a mineral oil internal breaker to Formulation #4 gave Formulation #5 which surprisingly produced a fairly immediate drop in viscosity that was almost completely broken after 36 hours. These formulations showed that the use of a mineral oil internal breaker together with a polyenoic acid internal breaker unexpectedly but effectively accelerated breaking in a high salinity composition mix water.

Figure 2:
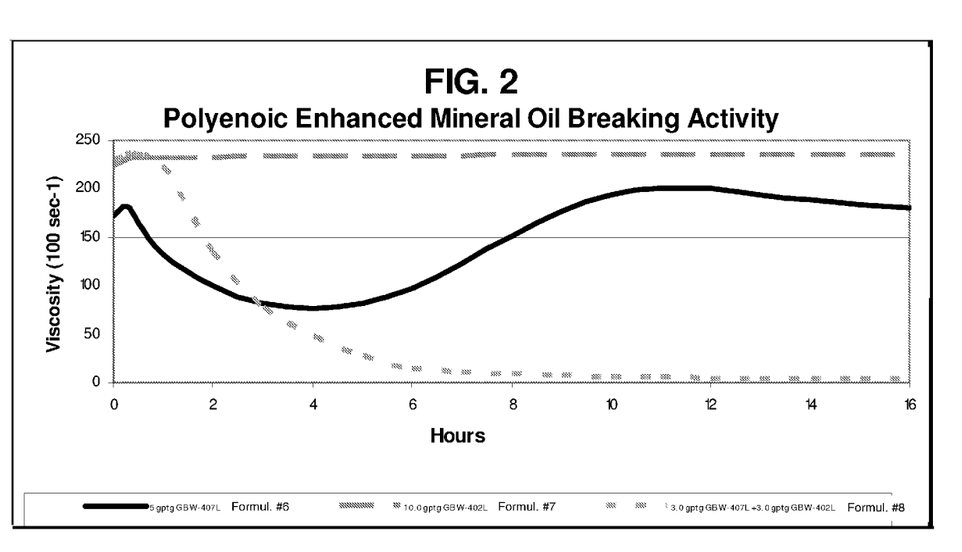
FIG. 2 is a graph showing the viscosity breaking results as a function of time using three different formulations of a brine having 14.0 ppg (1.7 kg/liter) CaBr$_2$, 5.0% WG-3L VES, and 15 pptg (1.8 kg/m$^3$) FLC-40 viscosity stabilizer and fluid loss control agent, first with only a polyenoic acid internal breaker, then with only a mineral oil internal breaker, and then using both, proving a synergistic result using both types of internal breakers.

Formulations of FIG. 2

The aqueous base fluid used in the experiments of FIG. 2 had 14.0 ppg (1.7 kg/liter) CaBr$_2$, 5.0% WG-3L VES, and 15 pptg (1.8 kg/m$^3$) FLC-40 fluid loss control agent. The FLC-40 agent was added to the mix water before the WG-3L VES. For these Formulations the fluid heat-up to 221° F. (105° C.) was approximately 20 minutes.

In Formulation #6, 5 gptg GBW-407L polyenoic acid internal breaker was added to the mix water after the WG-3L VES. This formulation gave a noticeable break very quickly, but at about four hours the viscosity began to recover and reached a peak of about 200 100 sec$^{-1}$ at about 11 hours, after which the viscosity gradually declined. Formulation #7 did not contain any polyenoic acid internal breaker, but did contain 10.0 gptg GBW-402L mineral oil internal breaker. It immediately gave a viscosity of about 230 100 sec$^{-1}$ which did not decrease over the 16 hour test period. However, in Formulation #8, 3.0 gptg GBW-407L polyenoic acid internal breaker (less than that used in Formulation #6) and 3.0 gptg GBW-402L mineral oil internal breaker (less than one-third of that used in Formulation #7) were used and surprisingly the viscosity began to break after about one hour and was essentially completely broken after about 7 hours. It may be noticed that the use of both the mineral oil internal breaker and the polyenoic acid internal breaker gave an unexpected synergistic result much more rapidly and completely than either of them had given separately at individually greater amounts.

As may be seen, the method of gel breaking described herein is simple, effective, safe, and highly cost-effective. A method is provided for enhancing the breaking the viscosity of aqueous treatment fluids gelled with viscoelastic surfactants (VESs). Compositions and methods are also furnished herein for breaking VES-surfactant fluids controllably, completely and relatively quickly with the use of both types of internal breakers described herein.

Compositions and methods are also disclosed herein for enhancing the breaking of VES-surfactant fluids where contact with reservoir fluids' external breaking mechanism is not required, although in some embodiments heat from the reservoir may help the breaking process. Compositions and methods are additionally provided for breaking VES-surfactant fluids where the different types of breaking additives are in a phase internal to the VES-surfactant fluid. Further, methods and VES fluid compositions are described herein for breaking the viscosity of aqueous fluids gelled with viscoelastic surfactants using readily available materials at relatively inexpensive concentrations, particularly when the two types of internal breakers are used together.

In one non-limiting explanation, it appears the internal breakers become dispersed throughout the VES micelles and appear to then be thermodynamically weak points where polyenoic autooxidation products and/or the mineral oil requires less thermodynamic energy to disturb the outer layer of "associated hydrophillic head groups and counterions" (K, Ca, etc. counterions) to degrade VES micelle viscosity by micelle rearrangement. This method to degrade VES micelles is not seen as spontaneous or very abrupt but rather a gradual mechanism for a given fluid temperature, VES loading, mix water salinity, type and amount of internal breakers, and the like, that can be crafted to allow control viscosity break over time, and can give an enhanced viscosity breaking compared to the cases where polyenoic or mineral oil breakers alone are used to access, disassociate, and/or disturb the VES micelles and reduce the fluid viscosity.

In the foregoing specification, the invention has been described with reference to specific embodiments thereof, and has been demonstrated as effective in providing methods and compositions for a VES fracturing fluid breaker mechanism. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of viscoelastic surfactants, mineral oil internal breakers, polyenoic acid internal breakers, and other components falling within the claimed parameters, but not specifically identified or tried in a particular composition or fluid, are anticipated to be within the scope of this invention.

The word "comprising" as used throughout the claims is to be interpreted to mean "including but not limited to."

What is claimed is:

1. A method for breaking the viscosity of aqueous fluids gelled with a viscoelastic surfactant (VES) comprising:
    adding to an aqueous fluid at least one VES in an amount effective to increase the viscosity thereof;
    adding to the aqueous fluid before, during or after the VES at least one first internal breaker in an amount effective to reduce the viscosity of the gelled aqueous fluid, where the first internal breaker is a mineral oil; and
    adding to the aqueous fluid before, during or after the VES at least one second internal breaker in an amount effective to reduce the viscosity of the gelled aqueous fluid, where the second internal breaker is selected from the group consisting of polyenoic acids, monoenoic acids and combinations thereof.

2. The method of claim 1 where
    the first internal breaker is present in an amount from about 50 to about 25,000 ppm based on the total fluid; and
    when the second internal breaker is present in an amount from about 100 to about 20,000 ppm based on the total fluid.

3. The method of claim 1 where the first internal breaker is at least about 99 wt % paraffin.

4. The method of claim 1 where the first internal breaker has a distillation temperature in the range from about 160 to about 550° C., and a kinematic viscosity at 40° C. of from about 1 to about 250 cSt.

5. The method of claim 1 where the second internal breaker is a polyenoic acid selected from the group consisting of linoleic acid, omega-3 fatty acids, omega-6 fatty acids, stearidonic acid, eleostearic acid, eicosadienoic acid, eicosatrienoic acid, arachidonic acid or eicosatetraenoic acid, eicosapentaenoic acid, docosapentaenoic acid, docosahexaenoic acid, cis-linoleic acid, cis-linolenic acid, gamma-linolenic acid, and conjugated polyenes.

6. The method of claim 1 where the second internal breaker is a monoenoic acid selected from the group consisting of obtusilic acid, caproleic acid, lauroleic acid, linderic acid, myristoleic acid, physeteric acid, tsuzuic acid, palmitoleic acid, petroselinic acid, oleic acid, vaccenic acid, gadoleic acid, gondoic acid, cetoleic acid, nervonic acid, erucic acid, elaidic acid, and t-vaccenic acid.

7. The method of claim 1 where the internal breakers are present in an oil-soluble internal phase of the aqueous fluid.

8. The method of claim 1 where the viscosity is broken within about 1 to about 16 hours at a temperature from about 25° C. to about 150° C.

9. The method of claim 1 where the viscosity is broken more rapidly with both the first and second internal breakers as compared with an identical aqueous fluid containing the same amount of either the first internal breaker or the second internal breaker alone.

10. A method for breaking the viscosity of aqueous fluids gelled with a viscoelastic surfactant (VES) comprising:
    adding to an aqueous fluid at least one VES in an amount effective to increase the viscosity thereof;
    adding to the aqueous fluid before, during or after the VES at least one first internal breaker in an amount from about 50 to about 25,000 ppm based on the total fluid, where the first internal breaker is a mineral oil; and
    adding to the aqueous fluid before, during or after the VES at least one second internal breaker in an amount from about 100 to about 20,000 ppm based on the total fluid, where the second internal breaker is a polyenoic acid,
    where the viscosity is broken more rapidly with both the first and second internal breakers as compared with an identical aqueous fluid containing the same amount of either the first internal breaker or the second internal breaker alone.

11. The method of claim 10 where the second internal breaker is selected from the group consisting of linoleic acid, omega-3 fatty acids, omega-6 fatty acids, stearidonic acid, eleostearic acid, eicosadienoic acid, eicosatrienoic acid, arachidonic acid or eicosatetraenoic acid, eicosapentaenoic acid, docosapentaenoic acid, docosahexaenoic acid, cis-linoleic acid, cis-linolenic acid, gamma-linolenic acid, and conjugated polyenes.

12. The method of claim 10 where the internal breakers are present in an oil-soluble internal phase of the aqueous fluid.

13. The method of claim 10 where the viscosity is broken within about 1 to about 16 hours at a temperature from about 25° C. to about 150° C.

* * * * *